US008959526B2

(12) United States Patent  (10) Patent No.: US 8,959,526 B2
Kansal et al.  (45) Date of Patent: Feb. 17, 2015

(54) SCHEDULING EXECUTION OF COMPLEMENTARY JOBS BASED ON RESOURCE USAGE (75) Inventors: Aman Kansal, Issaquah, WA (US); Weiwei Xiong, San Diego, CA (US); Jie Liu, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 13/156,542

(22) Filed: Jun. 9, 2011

(65) Prior Publication Data

US 2012/0317578 A1  Dec. 13, 2012

(51) Int. Cl.
*G06F 9/455* (2006.01)
*G06F 9/46* (2006.01)
*G06F 15/173* (2006.01)
*G06F 9/50* (2006.01)

(52) U.S. Cl.
CPC ...... *G06F 9/5077* (2013.01); *G06F 2209/5019* (2013.01)
USPC ............... 718/105; 718/1; 718/100; 718/102; 718/104; 709/223; 709/224; 709/226

(58) Field of Classification Search
None
See application file for complete search history.

(56) References Cited

U.S. PATENT DOCUMENTS

| 5,497,486 | A * | 3/1996 | Stolfo et al. | 1/1 |
|---|---|---|---|---|
| 7,958,509 | B2 * | 6/2011 | Aridor et al. | 718/104 |
| 2003/0120701 | A1 * | 6/2003 | Pulsipher et al. | 709/102 |
| 2004/0068729 | A1 | 4/2004 | Simon et al. | |
| 2005/0203988 | A1 * | 9/2005 | Nollet et al. | 709/201 |
| 2008/0276261 | A1 | 11/2008 | Munshi et al. | |
| 2008/0282244 | A1 * | 11/2008 | Wu et al. | 718/100 |
| 2009/0100436 | A1 | 4/2009 | Adya et al. | |
| 2010/0070664 | A1 * | 3/2010 | Schroth | 710/54 |
| 2010/0191716 | A1 | 7/2010 | Chen et al. | |
| 2010/0292980 | A1 | 11/2010 | Andrade et al. | |
| 2011/0107341 | A1 * | 5/2011 | Longobardi et al. | 718/102 |
| 2011/0167427 | A1 * | 7/2011 | Yoo et al. | 718/103 |
| 2012/0005685 | A1 * | 1/2012 | Chen et al. | 718/104 |
| 2012/0060171 | A1 * | 3/2012 | Bobroff et al. | 718/105 |
| 2012/0110584 | A1 * | 5/2012 | Chaudhry et al. | 718/102 |

OTHER PUBLICATIONS

Hindman, et al., "Mesos: A Platform for Fine-Grained Resource Sharing in the Data Center", Retrieved at <<http://www.eecs.berkeley.edu/Pubs/TechRpts/2010/EECS-2010-87.pdf>>, Electrical Engineering and Computer Sciences, University of California at Berkeley, Technical Report No. UCB/EECS-2010-87, May 26, 2010, pp. 18.

(Continued)

*Primary Examiner* — Charles Swift
(74) *Attorney, Agent, or Firm* — Heikki Einola; Judy Yee; Micky Minhas (57) ABSTRACT The subject disclosure is directed towards executing jobs based on resource usage. When a plurality of jobs is received, one or more jobs are mapped to one or more other jobs based on which resources are fully utilized or overloaded. The utilization of these resources by the one or more jobs complements utilization of these resources by the one or more other jobs. The resources are partitioned at one or more servers in order to efficiently execute the one or more jobs and the one or more other jobs. The resources may be partitioned equally or proportionally based on the resource usage or priorities.

20 Claims, 9 Drawing Sheets (56) References Cited

OTHER PUBLICATIONS

Hindman, et al., "Nexus: A Common Substrate for Cluster Computing", Retrieved at <<http://www.cs.berkeley.edu/~andyk/nexus.pdf>>, Electrical Engineering and Computer Sciences, University of California at Berkeley, Technical Report No. UCB/EECS-2009-158, Nov. 16, 2009, pp. 19.

Liu, et al., "Distributed Energy-Efficient Scheduling for Data-Intensive Applications with Deadline Constraints on Data Grids", Retrieved at <<http://ieeexplore.ieee.org/stamp/stamp.jsp?tp=&arnumber=4745123>>, Dec. 2008, pp. 26-33.

Bobroff, et al., "Dynamic Placement of Virtual Machines for Managing SLA Violations", Retrieved at <<http://ieeexplore.ieee.org/stamp/stamp.jsp?tp=&arnumber=4258528>>, Integrated Network Management, May 21, 2007, pp. 119-128.

Cafarella, et al., "Manimal: Relational Optimization for Data-intensive Programs", Retrieved at <<http://citeseerx.ist.psu.edu/viewdoc/download;jsessionid=79771565F57D5C6E28A0D8B4FAC8A19B?doi=10.1.1.167.501&rep=rep1&type=pdf>>, WebDB '10, Indianapolis, IN, USA, 2010, pp. 6.

Chen, et al., "Tiled-MapReduce: Optimizing Resource Usages of Data-parallel Applications on Multicore with Tiling", Retrieved at <<http://ppi.fudan.edu.cn/_media/publications%3Bostrich-pact10.pdf?id=rong_chen&cache=cache>>, PACT '10, Vienna, Austria, Sep. 11-15, 2010, pp. 12.

Dean, et al., "MapReduce: A Flexible Data Processing Tool", Retrieved at <<http://pages.cs.wisc.edu/~anhai/courses/784-sp10-anhai/mr-dean.pdf>>, Communications of the ACM, vol. 53, No. 1, Jan. 2010, pp. 72-77.

"Apache Hadoop", Retrieved at <<http://hadoop.apache.org/>>, Mar. 21, 2011, pp. 3.

Hermenier, et al., "Entropy: A Consolidation Manager for Clusters", Retrieved at <<https://gforge.inria.fr/docman/view.php/1603/5955/VEE09-slides.pdf>>, International Conference on Virtual Execution Environments, Washington, D.C., Mar. 12, 2009, pp. 34.

Isard, et al., "Dryad: Distributed Data-parallel Programs from Sequential Building Blocks", Retrieved at <<http://research.microsoft.com/en-us/projects/diyad/eurosys07.pdf>>, EuroSys '07, Lisboa, Portugal, Mar. 21-23, 2007, pp. 14.

Isard, et al., "Quincy: Fair Scheduling for Distributed Computing Clusters", Retrieved at <<http://www.sigops.org/sosp/sosp09/papers/isard-sosp09.pdf>>, Retrieved on Mar. 21, 2011, pp. 20.

Leverich, et al., "On the Energy (In)efficiency of Hadoop Clusters", Retrieved at <<http://csl.stanford.edu/~christos/publications/2009.hadoopenergy.hotpower.pdf>>, HotPower '09, 2009, pp. 5.

Yu, et al., "DryadLINQ: A System for General-purpose Distributed Data-parallel Computing using a High-level Language", Retrieved at <<http://research.microsoft.com/pubs/70861/DryadLINQ-osdi.pdf>>, 8th USENIX Symposium on Operating Systems Design and Implementation, USENIX Association, Retrieved on Mar. 21, 2011, pp. 14.

Yu, et al., "Some Sample Programs Written in DryadLINQ", Retrieved at <<http://research.microsoft.com/pubs/66811/programming-dryadlinq-dec2009.pdf>>, Dec. 3, 2009, pp. 37.

Zaharia, et al., "Improving MapReduce Performance in Heterogeneous Environments", Retrieved at <<http://www.usenix.org/event/osdi08/tech/full_papers/zaharia/zaharia.pdf>>, 8th USENIX Symposium on Operating Systems Design and Implementation, USENIX Association, Retrieved on Mar. 21, 2011, pp. 29-42.

* cited by examiner

SCHEDULING EXECUTION OF COMPLEMENTARY JOBS BASED ON RESOURCE USAGE

BACKGROUND

Parallel computing systems include a number of servers that execute resource intensive jobs on various amounts of data. Such systems are applicable in a variety of technologies, such as data mining, text indexing, trace data analysis for complex networks, machine learning, data clustering, machine translation and/or graphical processing.

Each of the resource intensive jobs includes a plurality of computing tasks (e.g., parallel computing tasks). Because the servers share in the execution of the resource intensive jobs, the plurality of computing tasks are executed generally in parallel over different data sets. When a particular task run on one of the servers, one or more resources (e.g., a processor (CPU) time, I/O capacity, network bandwidth and/or the like) may be fully utilized or overloaded while other resources are underutilized. As a result, current parallel computing systems often provide a workload throughput that is well below potential. Such inefficiency results in unnecessary capital expenditures due to additional servers and high operating costs due to inefficient power consumption and resource utilization.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards improved job scheduling/execution for large groups of servers (i.e., a datacenter or server cluster). In one aspect, a mapping mechanism processes resource usage data associated with a plurality of jobs and identifies two or more complementary jobs, which can be executed together on a same group of servers. For example, the two or more complementary jobs may include a job that fully utilizes or overloads a resource and another job that underutilizes that resource.

In another aspect, each of the two or more complementary jobs includes a plurality of tasks, such as parallel computing tasks. Tasks from different jobs may match in a manner similar to identifying complementary jobs. As an example, a task that consumes a large amount of I/O capacity while another task requires a negligible amount are executed together at a single server in order to enhance resource utilization efficiency.

In another aspect, an assignment mechanism selects a group of servers for executing the two or more complementary jobs. For example, servers whose available resources satisfy resource requirements are well-suited. In another aspect, the assignment mechanism partitions resources at the group of servers in accordance with various policies. For example, the assignment mechanism allocates I/O capacity and/or processor time in proportion to the resource usage data. As another example, I/O capacity and processor time are partitioned equally amongst the two or more complementary jobs.

In another aspect, the assignment mechanism increases a resource allocation for a high priority job in order to improve a completion time. In yet another aspect, the assignment mechanism modifies a current resource allocation in response to an assignment of one or more new jobs. For example, the assignment mechanism decreases an amount of processor time that is allocated to the two or more complementary jobs if the one or more new jobs overload a processor.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards assigning complementary jobs to servers based on resource usage data. As described herein, a scheduling mechanism identifies the complementary jobs amongst a plurality of jobs and partitions resources at a group of servers in an efficient manner to execute the complementary jobs. A job refers to a data processing program that includes at least one processing phase that can be parallelized.

Each of the group of servers has programmatic control over these resources. In addition, the group of servers form a portion of a cluster (i.e., a server cluster or a data center) comprising a plurality of servers being managed as one unit. The group of servers includes physical computers. Alternatively or in addition, the group of servers may include virtual machines that run on the physical computers.

According to one exemplary implementation, the complementary jobs include one more jobs that overload a particular resource and one or more other jobs that underutilize the particular resource. In such an example, utilization of the particular resource by the one or more jobs complements utilization of the particular resource by the one or more other jobs. For this reason, the one or more jobs and the one or more other jobs are executed simultaneously.

In one exemplary implementation, the one or more jobs include a plurality of tasks that are executed in parallel on the group of servers. Based on the resource usage data, some of the plurality of tasks match tasks associated with the one or more other jobs. For example, one of the matching tasks may be configured to be processor (CPU) intensive, whereas another one of the matching tasks may create a bottleneck (i.e., an overload) on memory/storage capacity while requiring a negligible amount of processor time (i.e., CPU cycles) according to one example.

When a single server simultaneously executes both of the matching tasks, overall performance improves because one or more of the resources that were underutilized are also employed in doing useful work and each task is allocated an appropriate amount of processor time and storage capacity. In contrast, executing two processor intensive tasks at the server causes an increase in total processing time because these tasks include processor requirements that make each other wait for available processor time. Furthermore, executing the matching tasks improves amortization of idle electrical power.

The scheduling mechanism implements alternative resource partition policies for processor time and storage capacity as described herein. In one exemplary implementation, each of the matching tasks is allocated an amount of processor time in proportion to a resource requirement as indicated by an average usage or a predefined service demand. Accordingly, the allocated amount may be equal to or less than the resource requirement. For example, the available processor time is partitioned according to a ratio between a processor time requirement of one of the matching tasks and a processor time requirement for the other matching task.

Instead of allocating processor time to the matching tasks proportionally, the available processor time may be partitioned into equal portions in one exemplary implementation. Another exemplary policy in which the available processor time is partitioned proportionally includes allocating an amount of processor time that is equal to or in excess of a resource requirement for one of the matching tasks. Such a partition results in an improved total completion time for a higher priority job of the complementary jobs. Because the other matching task corresponds with a lower priority job, the scheduling mechanism allocates an amount of processor time that may be less than an associated resource requirement.

According to another exemplary implementation, the available processor time is partitioned equally or proportionally, but the scheduling mechanism modifies such a partition in response to an assignment of one or more jobs to the server. For example, some of the processor time that is allocated to one of the matching tasks is reallocated to the other matching task. Modifying the processor time allocations may be performed during execution of the matching tasks.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
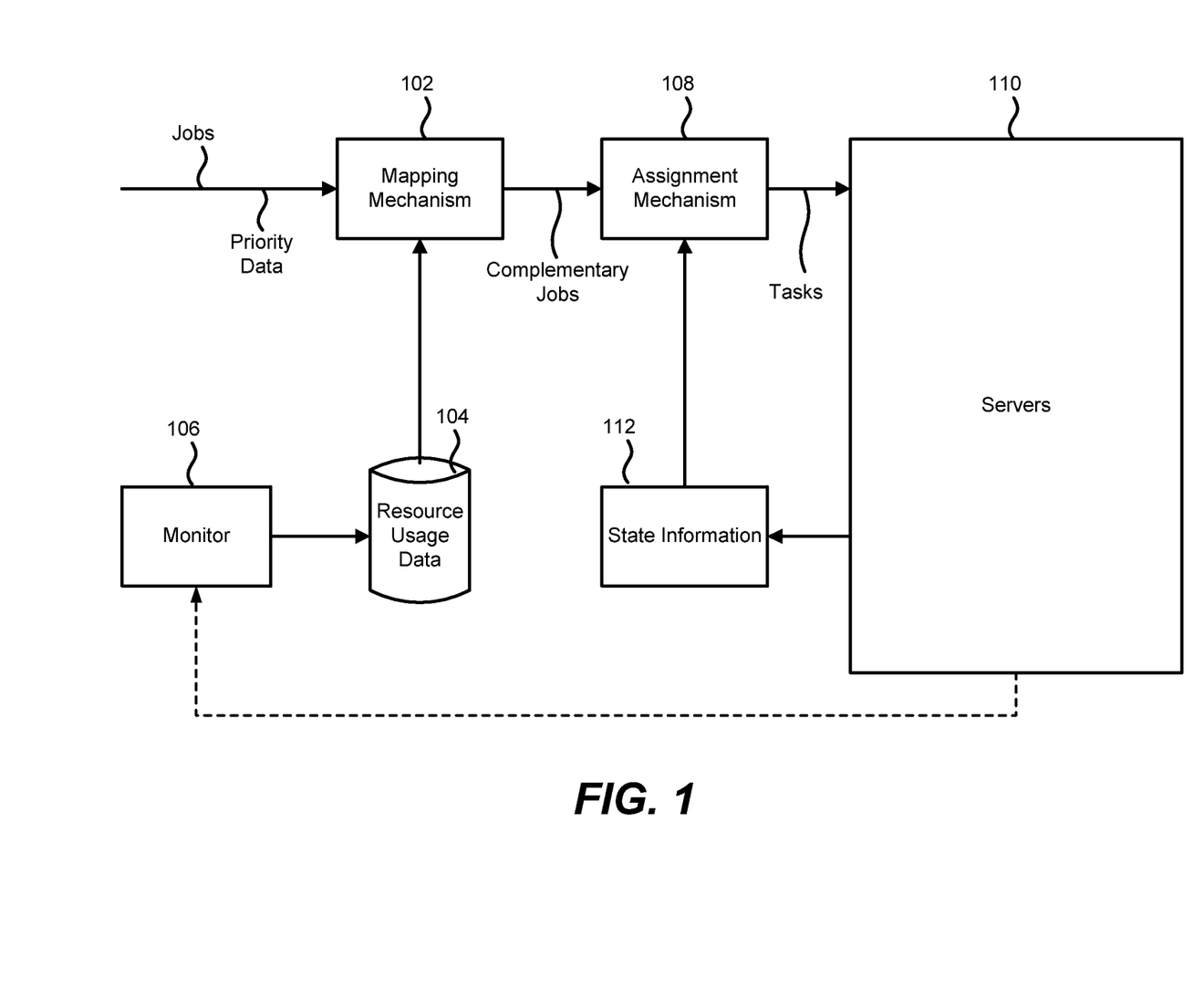
FIG. 1 is a block diagram illustrating an exemplary system for scheduling execution of complementary jobs based on resource usage.

FIG. 1 is a block diagram illustrating an exemplary system for scheduling execution of complementary jobs based on resource usage. A mapping mechanism 102 within the exemplary system receives a plurality of jobs from various sources and identifies two or more jobs whose respective resource utilizations complement each other. For example, the complementary jobs may include one or more jobs that are processor intensive and one or more other jobs that require a relatively small amount of processor time.

According to one exemplary implementation, the mapping mechanism 102 uses resource usage data 104 to determine which of the plurality of jobs utilizes a highest amount of a particular resource. For each of the plurality of jobs, the resource usage data 104 indicates resource requirements. As an example, a required amount of processor time includes an average amount of processor time that is utilized by a certain job. A monitor 106 is configured to collect and store various statistics, such processor usage and I/O capacities associated with the plurality of jobs, in the resource usage data 104 over a period of time.

The mapping mechanism 102 communicates the complementary jobs comprising a plurality of tasks to an assignment mechanism 108, which partitions resources at servers 110 and schedules task execution for the complementary jobs. In one exemplary implementation, the plurality of tasks include parallel data computing tasks that are executing across the servers 110 simultaneously. Some of the plurality of tasks correspond with each other with respect to the resource usage data 104. Similar to approaches for identifying the complementary jobs, the assignment mechanism 108 identifies two or more matching tasks in which a resource utilization by one or more tasks complements a corresponding resource utilization by one or more other tasks.

The assignment mechanism 108 schedules execution of the two or more matching tasks by selecting a server of the servers 110 and partitions one or more resources based on various policies. In view of state information 112 comprising amounts of available resources at each of the servers 110, the assignment mechanism 108 selects the server having a lightest load and hence, highest amounts of the available resources. In one exemplary implementation, the assignment mechanism 108 allocates the available resources to the two or more matching tasks in equal portions.

In another exemplary implementation, the assignment mechanism 108 allocates an amount of each available resource in proportion to a ratio of resource requirements between the two or more matching tasks. Accordingly, each task is allocated a percentage of the available resources that is equal to the ratio. Alternatively, the assignment mechanism 108 allocates an amount of each available resource based on priority data. As described herein, the assignment mechanism 108 allocates required amounts of each resource to tasks associated with a higher priority job regardless of the resource requirements of one or more lower priority jobs in order to ensure an improved completion time for the higher priority job.

Figure 2:
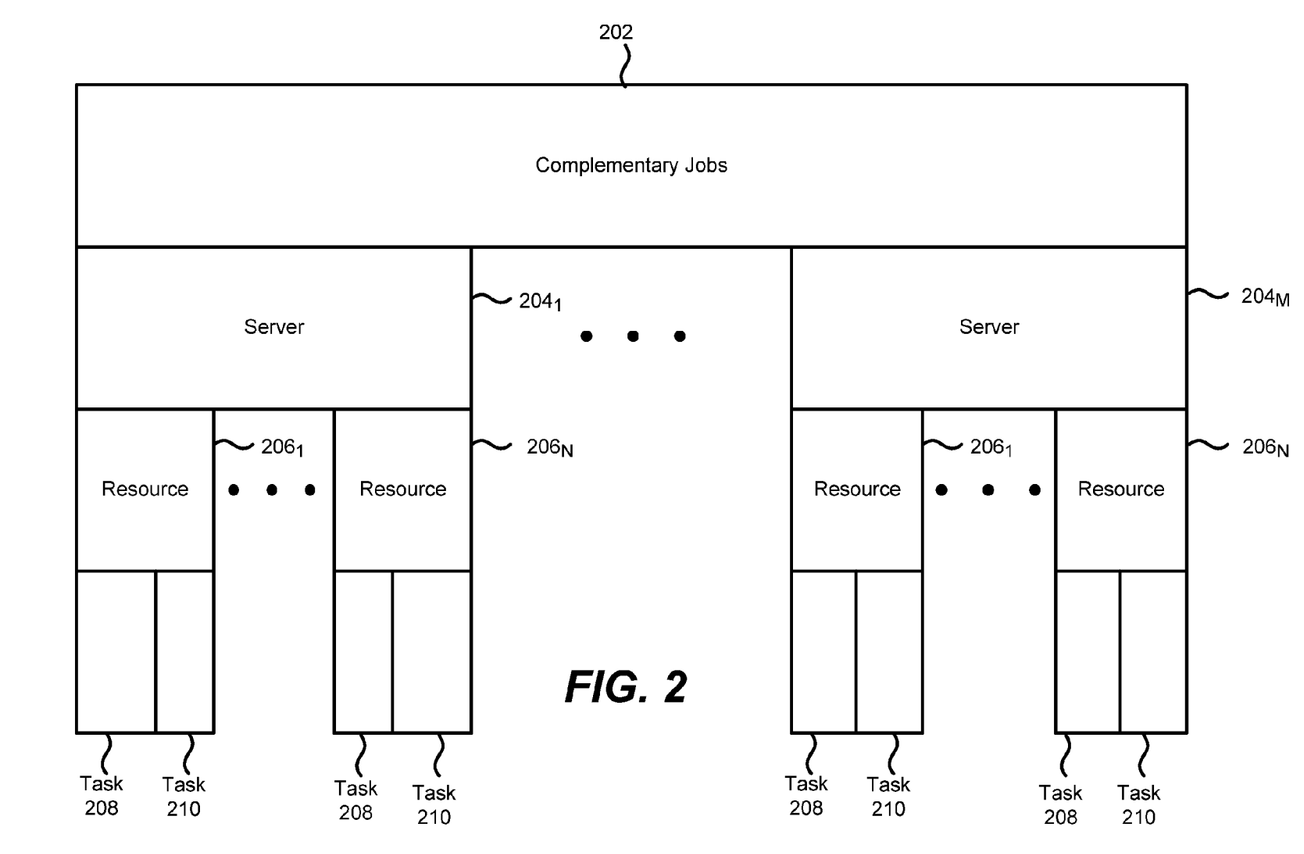
FIG. 2 is an example graphical representation of a resource partition for executing complementary jobs.

FIG. 2 is a graphical representation of a resource partition for executing complementary jobs 202 on a plurality of servers $204_{1 \ldots M}$. Each of the plurality of servers $204_{1 \ldots M}$ includes a plurality of resources $206_{1 \ldots N}$ on which a task 208 and a task 210 are executed. In one implementation, the task 208 and the task 210 are executed in parallel across the plurality of servers $204_{1 \ldots M}$ but on different data sets.

According to one implementation, some of the plurality of resources $206_{1 \ldots N}$ are partitioned using a virtualization technology. For example, the assignment mechanism 108 communicates with a mechanism for creating several virtual servers (i.e., virtual machines) from one physical machine. In another implementation, the assignment mechanism 108 allocates the plurality of resources $206_{1 \ldots N}$ via a time sharing mechanism associated with an operating system. Alternatively, the assignment mechanism 108 uses a well-known resource allocation system to limit how much of the plurality of resources $206_{1 \ldots N}$ are available for executing the complementary jobs 202.

FIG. 2 illustrates a proportional partitioning policy and an equal partitioning policy implemented in the server $204_1$ and the server $204_M$, respectively. Based on resource usage data (e.g., the resource usage data 104 of FIG. 1), the task 208 and the task 210 overload the resource $206_1$ and the resource $206_N$, respectively. In one implementation of the proportional partitioning policy, the task 208 is allocated more of the resource $206_1$ and, vice versa, the task 210 is allocated more of the resource $206_N$. For example, the task 208 is allocated a portion of available I/O capacity that is equal to a ratio between average I/O utilizations of the task 208 and the task 210. In one implementation of the equal partitioning policy, the task 208 and the task 210 are allocated equal portions of the resource $206_1$ and the resource $206_N$.

Figure 3:
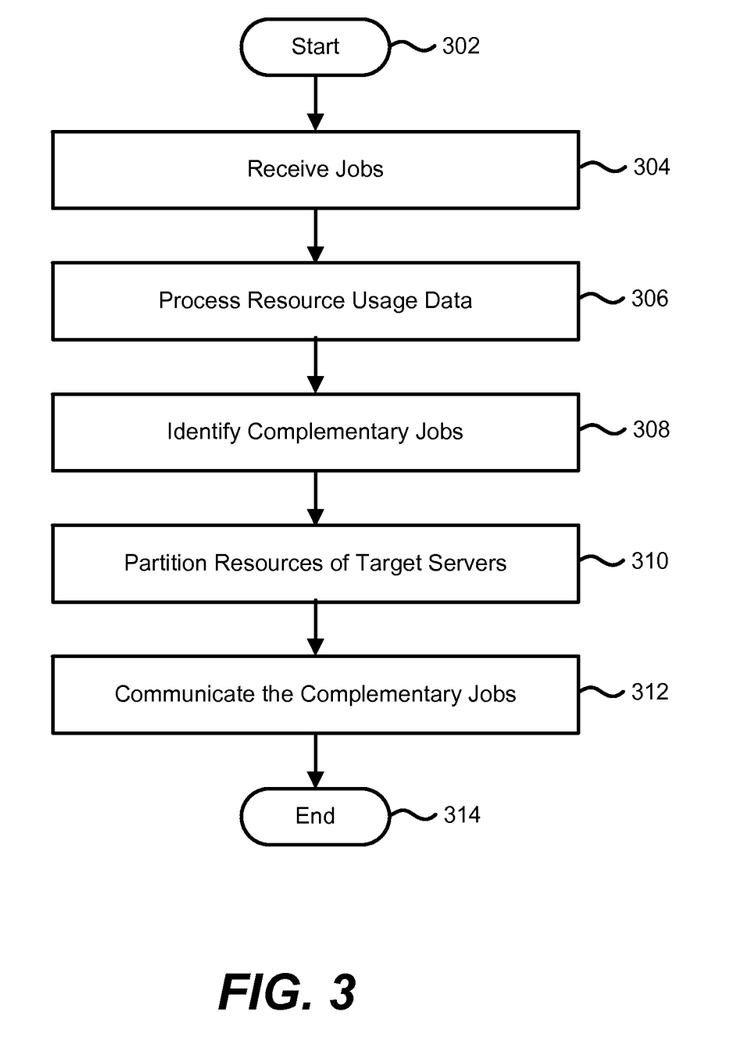
FIG. 3 is a flow diagram illustrating example steps for scheduling execution of complementary jobs based on resource usage.

FIG. 3 is a flow diagram illustrating steps for scheduling execution of complementary jobs based on resource usage. Steps depicted in FIG. 3 commence at step 302 and proceed to step 304 when a plurality of jobs are received. In one implementation, the step 302 to step 314 are performed by various software modules, such as the mapping mechanism 102 and the assignment mechanism 108 of FIG. 1.

Step 306 represents processing resource usage data 104. In one implementation, a datacenter comprising a plurality of servers implements a distributed monitoring system that collects the resource usage data 104 over time. Such a system monitors execution of multiple jobs belonging to a certain application. The resource usage data 104 is updated as additional jobs from the certain application are executed.

Step 308 illustrates identification of complementary jobs. For each resource, the mapping mechanism 102 (FIG. 1) identifies one or more jobs that utilize a highest amount, which may constitute as a bottleneck for an associated application. Two or more jobs are complementary when each job overloads different resources. Some of these jobs underutilize another resource. For example, the complementary jobs include one or more jobs that overload a particular resource of which one or more other jobs utilize a negligible amount.

Figure 5:
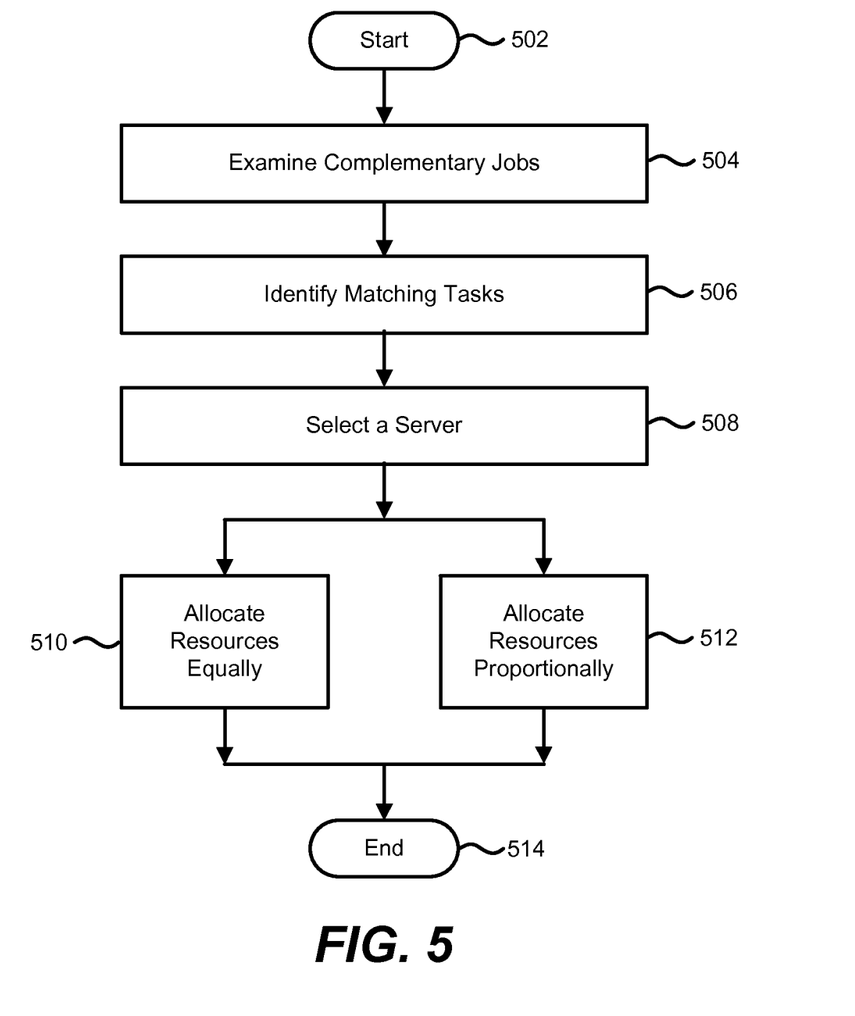
FIG. 5 is a flow diagram illustrating example steps for scheduling task execution for complementary jobs on a server.
Figure 6:
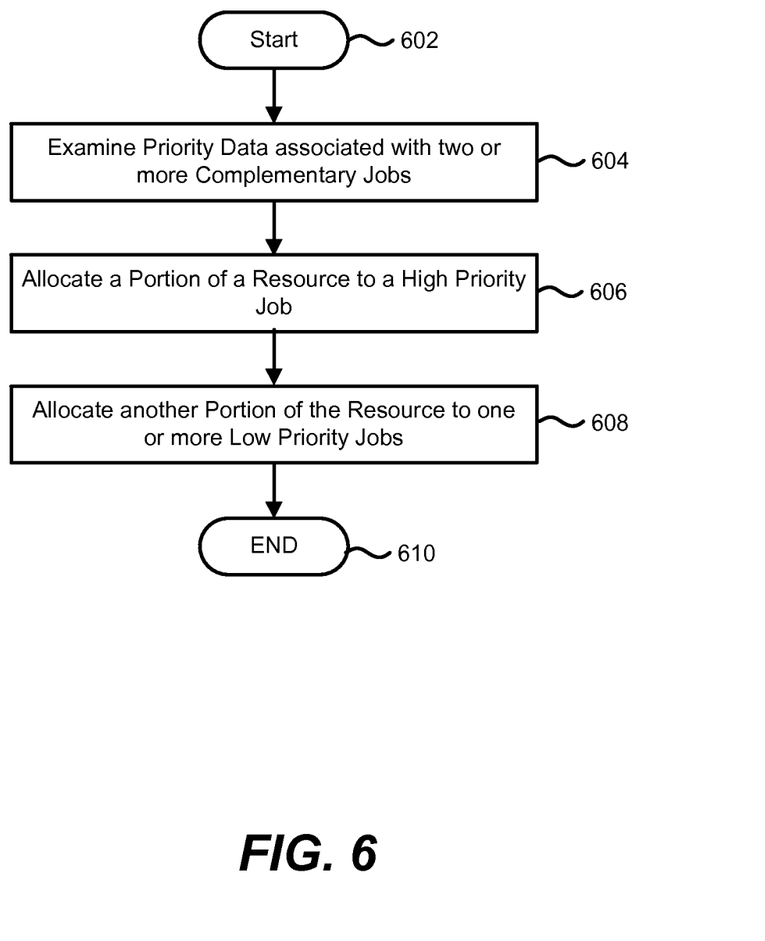
FIG. 6 is a flow diagram illustrating example steps for partitioning at least one resource amongst at least two matched tasks.

Step 310 illustrates partitioning of resources at target servers for the complementary jobs. As described herein, the assignment mechanism 108 partitions the resources according to various policies. As illustrated in FIG. 5, the resources are partitions equally or proportionally. An example of a proportional partition is illustrated in FIG. 6.

Step 312 represents communication of the complementary jobs. In one implementation, the assignment mechanism 108 communicates the complementary jobs to the target servers, such as the servers 110 of FIG. 1, along with instructions on partitioning the resources. Step 314 represents termination of the steps for scheduling the execution of the complementary jobs based on the resource usage data.

Figure 4:
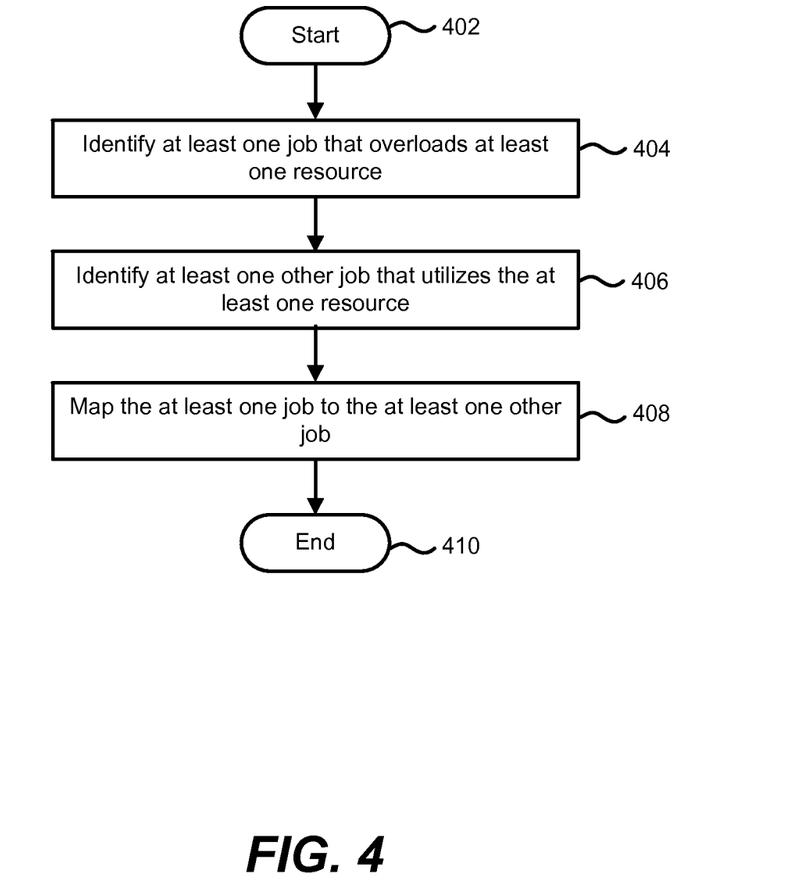
FIG. 4 is a flow diagram illustrating example steps for identifying at least two complementary jobs amongst a plurality of jobs.

FIG. 4 is a flow diagram illustrating steps for identifying at least two complementary jobs amongst a plurality of jobs. Steps depicted in FIG. 4 commence at step 402 and proceed to step 404 where at least one job that overloads at least one resource is identified. Based on resource usage data, the at least one job utilizes a highest average amount of the at least one resource.

Step 406 illustrates identifying at least one other job that utilizes the at least one resource. In one exemplary implementation, the at least one other job utilizes a negligible amount of the at least one resource and overload at least one other resource. Accordingly, the at least one job and the at least one other job are complementary because both groups of jobs are executable at a same time on a same server. Step 408 illustrates mapping of the at least one job to the at least one other job such that both groups are scheduled for execution simultaneously. Step 410 represents terminating the identification of at least two complementary jobs.

FIG. 5 is a flow diagram illustrating steps for scheduling task execution for complementary jobs on a server. Steps depicted in FIG. 5 commence at step 502 and proceed to step 504 where complementary jobs are examined.

Step 506 represents identification of matching tasks between the complementary jobs. As described herein, the matching tasks overload different resources and can be executed together in order to improve completion time and resource usage efficiency. In one exemplary implementation, the matching tasks include parallel data computing tasks that are executed across a plurality of servers in a datacenter.

Step 508 illustrates selection of a server based on available resources. In one implementation, the server state information 112 includes data indicating available amounts of each resource across the plurality of servers. Based on such data, the assignment mechanism 108 selects the server having a highest available amount of one or more resources, such as the overloaded resources associated with the matching tasks. In one implementation, the matching tasks are assigned to the server such that a sum total of resource requirements equals or falls below a total available amount (i.e., capacity) of the one or more resources. Once the server is selected, the assignment mechanism 108 proceeds to partition the one or more resources in accordance with various policies as described herein.

Step 510 represents an implementation of a partitioning policy where the available resources are allocated equally amongst the matching tasks. Each of the matching tasks, for example, utilizes an equal amount of processor time, I/O capacity and/or the like during execution. Step 512 represents an implementation of an alternate partitioning policy where the available resources are allocated proportionally amongst the matching tasks. Such a partitioning is based on priority data or resource usage data. Each of the matching tasks, for example, utilizes an amount of an available I/O capacity in proportion to I/O capacity requirements. FIG. 6 illustrates partitioning of the available resources based on priority data. Step 514 illustrates termination of the partitioning of the available resources at the server.

FIG. 6 is a flow diagram illustrating steps for partitioning a resource for two or more complementary jobs using priority data. Steps depicted in FIG. 6 commence at step 602 and proceed to step 604 where priority data associated with the two or more complementary jobs is examined. Although FIG. 6 refers to partitioning a particular resource for a high priority job, it is appreciated that the following steps can be applied in other implementations having more than one high priority job. In one implementation, the high priority job overloads the particular resource.

Step 606 illustrates an allocation of a portion of the particular resource to the high priority job of the complementary jobs. In one implementation, the allocated portion is equal to or exceeds a required amount of the particular resource and ensures an improved completion time for the execution of the high priority job. Step 608 illustrates an allocation of the resource to a low priority job. Step 602 to 608 end at step 610.

Figure 7:
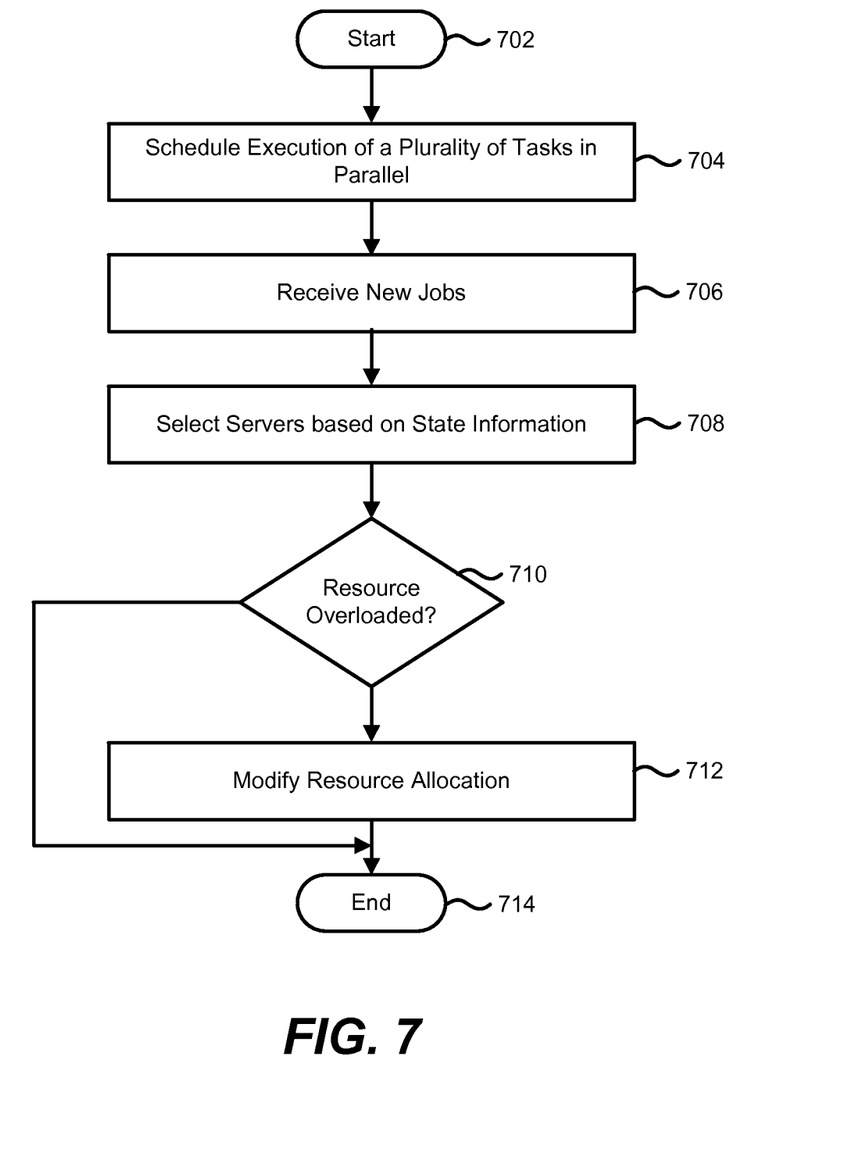
FIG. 7 is a flow diagram illustrating example steps for modifying a resource partition in response to an assignment of at least one new job.

FIG. 7 is a flow diagram illustrating steps for modifying a resource partition in response to an assignment of at least one new job. Steps depicted in FIG. 7 commence at step 702 and proceed to step 704 where a plurality of tasks are scheduled for execution in parallel across one or more servers. The plurality of tasks includes parallel data computing tasks that correspond with two or more complementary jobs. In one exemplary implementation, step 704 represents steps 302 to 314 of FIG. 3.

Step 706 represents receiving new jobs from various sources after scheduling task execution for the two or more complementary jobs. Step 708 illustrates a selection of the one or more servers based on an examination of state information. The one or more servers include sufficient amounts of each resource and thus, are well-suited for executing the new jobs. In one exemplary implementation, the assignment mechanism 108 determines an available amount of each resource and compares these amounts to the resource usage data 104. The assignment mechanism 108 selects one or more servers having a highest number of resources that can provide the required amount to execute the new jobs.

Step 710 represents a determination as to whether any of the resources on any of the one or more servers is overloaded given the assignment of the new jobs to the one or more servers. If one or more of the resources is overloaded, step 712 is performed where one or more corresponding allocations are modified to accommodate the new jobs. Accordingly, the two or more complementary jobs and the new jobs are executed together. If the new jobs overload a processor, for example, the assignment mechanism decreases an amount of processor time that is allocated to executing the two or more complementary jobs in order to improve overall resource utilization efficiency. If none of the resources are overloaded, step 714 terminates the steps of FIG. 7.

Exemplary Networked and Distributed Environments

One of ordinary skill in the art can appreciate that the various embodiments of application testing systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 8:
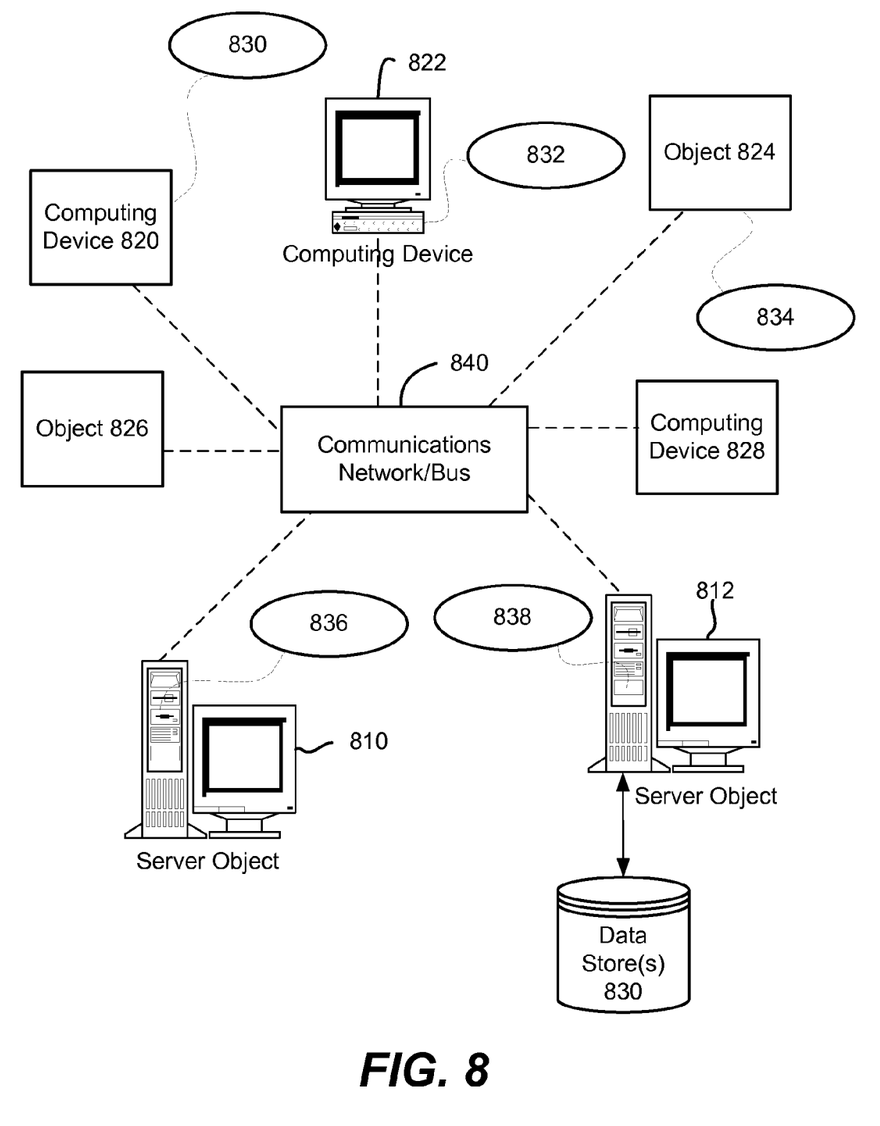
FIG. 8 is a block diagram representing exemplary non-limiting networked environments in which various embodiments described herein can be implemented.

FIG. 8 provides a schematic diagram of an exemplary networked or distributed computing environment. The distributed computing environment comprises computing objects 810, 812, etc., and computing objects or devices 820, 822, 824, 826, 828, etc., which may include programs, methods, data stores, programmable logic, etc. as represented by example applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing object or device 820, 822, 824, 826, 828, etc. can also contain an application, such as applications 830, 832, 834, 836, 838, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc., acting as servers provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 840 or bus is the Internet, for example, the computing objects 810, 812, etc. can be Web servers with which other computing objects or devices 820, 822, 824, 826, 828, etc. communicate via any of a number of known protocols, such as the hypertext transfer protocol (HTTP). Computing objects 810, 812, etc. acting as servers may also serve as clients, e.g., computing objects or devices 820, 822, 824, 826, 828, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
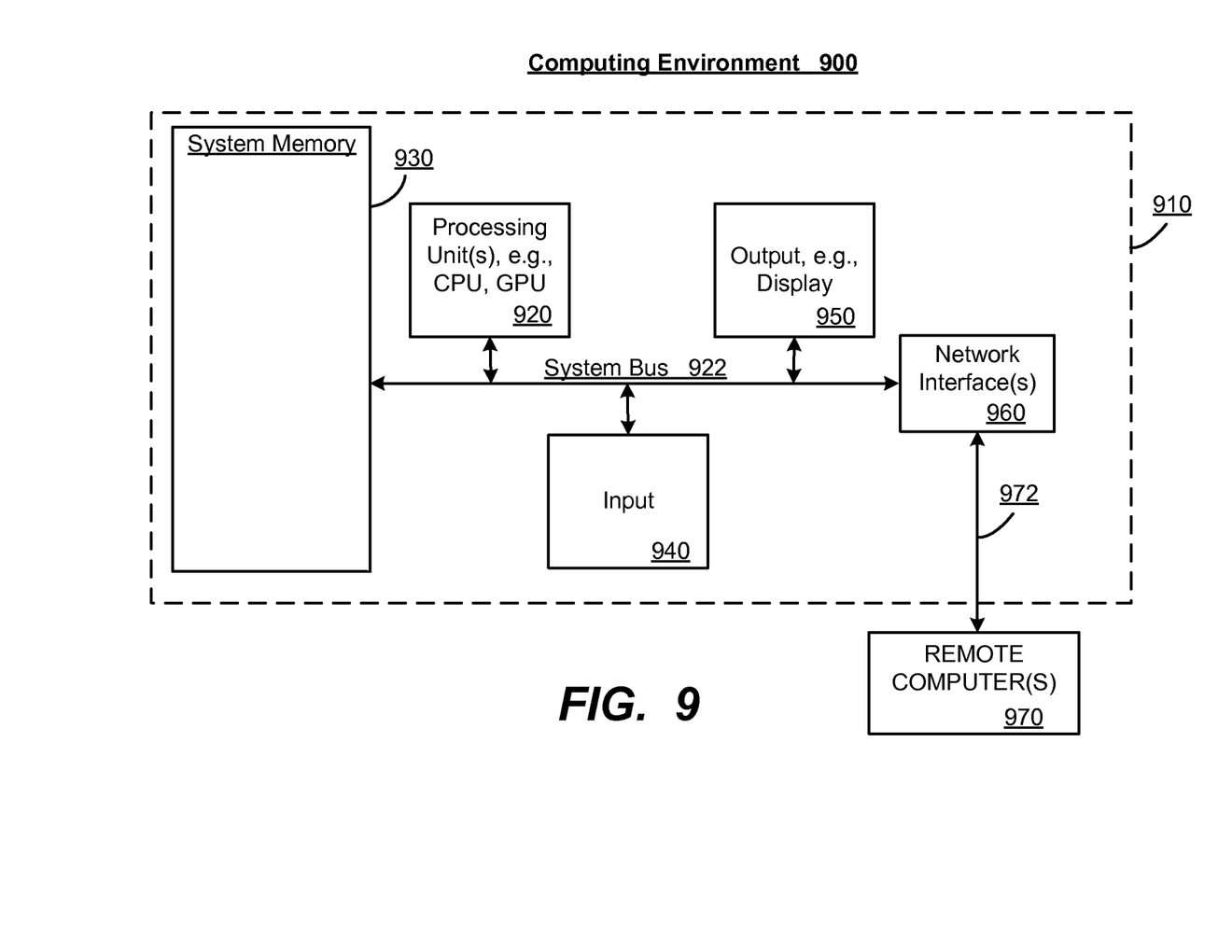
FIG. 9 is a block diagram representing an exemplary non-limiting computing system or operating environment in which one or more aspects of various embodiments described herein can be implemented.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the exemplary computing system environment 900.

With reference to FIG. 9, an exemplary remote device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
processing a plurality of jobs, including processing resource usage data for the plurality of jobs, identifying two or more complementary jobs of the plurality of jobs, and mapping at least one job of the plurality of jobs to at least one other complementary job of the plurality of jobs based on the resource usage data, wherein complementary jobs have disparate utilization of a same resource during parallel execution;
identifying at least two matching tasks of the at least one job and the at least one other job based on resource usage data, wherein the at least two matching tasks overload different resources and can be executed together; and
executing the at least one job and the at least one other job on the same resource.

2. The method of claim 1 further comprising:
allocating an amount of time to each of the at least two matching tasks for resource usage.

3. The method of claim 1 further comprising:
partitioning an available amount of time for resource usage according to a ratio between a resource time requirement of each of the at least two matching tasks.

4. The method of claim 1 further comprising executing at least one group of matched tasks at a server.

5. The method of claim 1 further comprising partitioning the at least one resource based on the resource usage data or priority data.

6. The method of claim 1 further comprising selecting a server to execute at least one group of matched tasks in response to state information.

7. The method of claim 1 further comprising modifying resource partitions at a server.

8. The method of claim 1 further comprising allocating the at least one resource to at least two matched tasks, equally or proportionally based on the resource usage data.

9. In a computing environment, a system, comprising:
at least one processor;
a mapping mechanism implemented on the at least one processor and configured to identify at least two complementary jobs amongst a plurality of jobs using resource usage data, wherein the mapping mechanism is coupled to an assignment mechanism configured to allocate a plurality of resources amongst the at least two complementary jobs, wherein the at least two complementary jobs have disparate utilization of at least one same resource of the plurality of resources during parallel execution, wherein at least one of the at least two complementary jobs overloads at least one resource and at least another one of the at least two complementary jobs overloads at least one other resource, wherein the assignment mechanism is coupled to at least one server comprising the plurality of resources, and wherein the assignment mechanism is configured to select a resource of the at least one server to execute at least two matching tasks of the at least two complementary jobs.

10. The system of claim 9, wherein the assignment mechanism is configured to partition an available amount of time for resource usage according to a ratio between a resource time requirement of each of the at least two matching tasks.

11. The system of claim 9, wherein the assignment mechanism is configured to allocate a portion of at least one resource of the plurality of resources to at least one higher priority job of the at least two complementary jobs and is configured to allocate another portion of the at least one resource to at least one lower priority job of the at least two complementary jobs, wherein the portion of the at least one resource exceeds the other portion of the at least one resource.

12. The system of claim 9, wherein the assignment mechanism is configured to allocate an amount of time to each of the at least two matching tasks for resource usage.

13. The system of claim 9, wherein the assignment mechanism is configured to partition a resource at a server for at least one group of matched tasks of the at least two complementary jobs into equal portions or in proportion to the resource usage data associated the resource.

14. The system of claim 13, wherein the assignment mechanism is configured to modify the partition of the resource at the server in response to an assignment of another at least two complementary jobs.

15. The system of claim 9, wherein each of the at least two complementary jobs comprises a plurality of tasks that are executed in parallel on the at least one server.

16. One or more computer storage memory having computer-executable instructions, which when executed perform steps, comprising:
identifying at least one job that overloads at least one resource of a plurality of resources;
identifying at least one other complementary job that overloads at least one other resource, wherein utilization of the at least one resource by the at least one other complementary job complements the at least one job and utilization of the at least one other resource by the at least one job complements the at least one other complementary job, and wherein complementary jobs have disparate utilization of at least one same resource;

partitioning the plurality of resources on at least one server for the at least one job and the at least one other complementary job; and executing the at least one job and the at least one other complementary job on the at least one server.

17. The one or more computer storage memory of claim 16 having further computer-executable instructions comprising:
    identifying at least one task of the at least one job that matches at one other task of the at least one other complementary job based on resource usage data;
    allocating the at least one resource to the at least one task and the at least one other task equally or proportionally according to the resource usage data; and
    allocating the at least one other resource to the at least one task and the at least one other task equally or proportionally according to the resource usage data.

18. The one or more computer storage memory of claim 17 having further computer-executable instructions comprising:
    executing the at least one task and the at least one other task in parallel.

19. The one or more computer storage memory of claim 17 having further computer-executable instructions comprising:
    modifying allocations of the at least one resource and the at least one other resource.

20. The one or more computer storage memory of claim 16 having further computer-executable instructions comprising:
    partitioning the at least one resource or the at least one other resource according to priority data.

* * * * *